(12) United States Patent
Sydir et al.

(10) Patent No.: US 8,886,230 B2
(45) Date of Patent: Nov. 11, 2014

(54) SYSTEMS AND METHODS FOR SERVICE SET IDENTIFIER-BASED LOCATION DETECTION

(75) Inventors: Jaroslaw J. Sydir, San Jose, CA (US); Anthony G. Lamarca, Seattle, WA (US); Srikathyayani Srikanteswara, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/569,218

(22) Filed: Aug. 8, 2012

(65) Prior Publication Data

US 2014/0045536 A1 Feb. 13, 2014

(51) Int. Cl.
*H04W 24/00* (2009.01)
*H04W 4/02* (2009.01)
(52) U.S. Cl.
CPC ............... *H04W 4/025* (2013.01); *H04W 4/02* (2013.01)
USPC ..................... 455/456.6; 455/456.1
(58) Field of Classification Search
USPC ............................. 455/456.1, 456.6
See application file for complete search history.

(56) References Cited

U.S. PATENT DOCUMENTS

| | | | | |
|---|---|---|---|---|
| 7,814,311 | B2 * | 10/2010 | Convery et al. | 713/153 |
| 7,884,238 | B2 * | 2/2011 | Cremer et al. | 562/532 |
| 8,311,557 | B2 * | 11/2012 | Annamalai | 455/456.1 |
| 2007/0201382 | A1 * | 8/2007 | Ekl et al. | 370/254 |
| 2009/0088183 | A1 | 4/2009 | Piersol et al. | |
| 2009/0109870 | A1 * | 4/2009 | Metke et al. | 370/254 |
| 2010/0157955 | A1 * | 6/2010 | Liu et al. | 370/336 |
| 2010/0165875 | A1 * | 7/2010 | Kneckt et al. | 370/254 |
| 2010/0246419 | A1 | 9/2010 | Batta et al. | |
| 2011/0177831 | A1 * | 7/2011 | Huang | 455/457 |

FOREIGN PATENT DOCUMENTS

| | | |
|---|---|---|
| EP | 2046084 A1 | 4/2009 |
| KR | 10-2011-0016303 A | 2/2011 |
| KR | 10-2012-0087472 A | 8/2012 |

OTHER PUBLICATIONS

International Search Report and Written Opinion Received for Patent Application No. PCT/US2013/047403, Mailed on Oct. 22, 2013, 12 pages.

\* cited by examiner

*Primary Examiner* — Omoniyi Obayanju
(74) *Attorney, Agent, or Firm* — Sutherland Asbill & Brennan LLP

(57) ABSTRACT

Systems and methods are disclosed for identifying a location based at least in part on identifying a wireless access point and at least one service set identifier associated with the wireless access point.

19 Claims, 7 Drawing Sheets

SYSTEMS AND METHODS FOR SERVICE SET IDENTIFIER-BASED LOCATION DETECTION

FIELD OF THE DISCLOSURE

The present disclosure generally relates to location detection, and more particularly to systems and methods for service set identifier (SSID)-based location detection.

BACKGROUND

Generally, electronic devices, such as mobile communications devices, may provide various location aware services. These services may be provided by the electronic devices by running one or more instructions and/or applications that may request, receive, and/or make use of positional information. The electronic devices, therefore, may be able to determine their location and/or position using a variety of mechanisms including, for example, satellite-based triangulation, wireless fidelity (Wi-Fi) access point (AP) detection, or cellular service-based triangulation. However, each of these processes and mechanisms may consume relatively high levels of energy and, in the case of mobile devices, may quickly deplete available energy storage devices and batteries.

DETAILED DESCRIPTION

Figure 1:
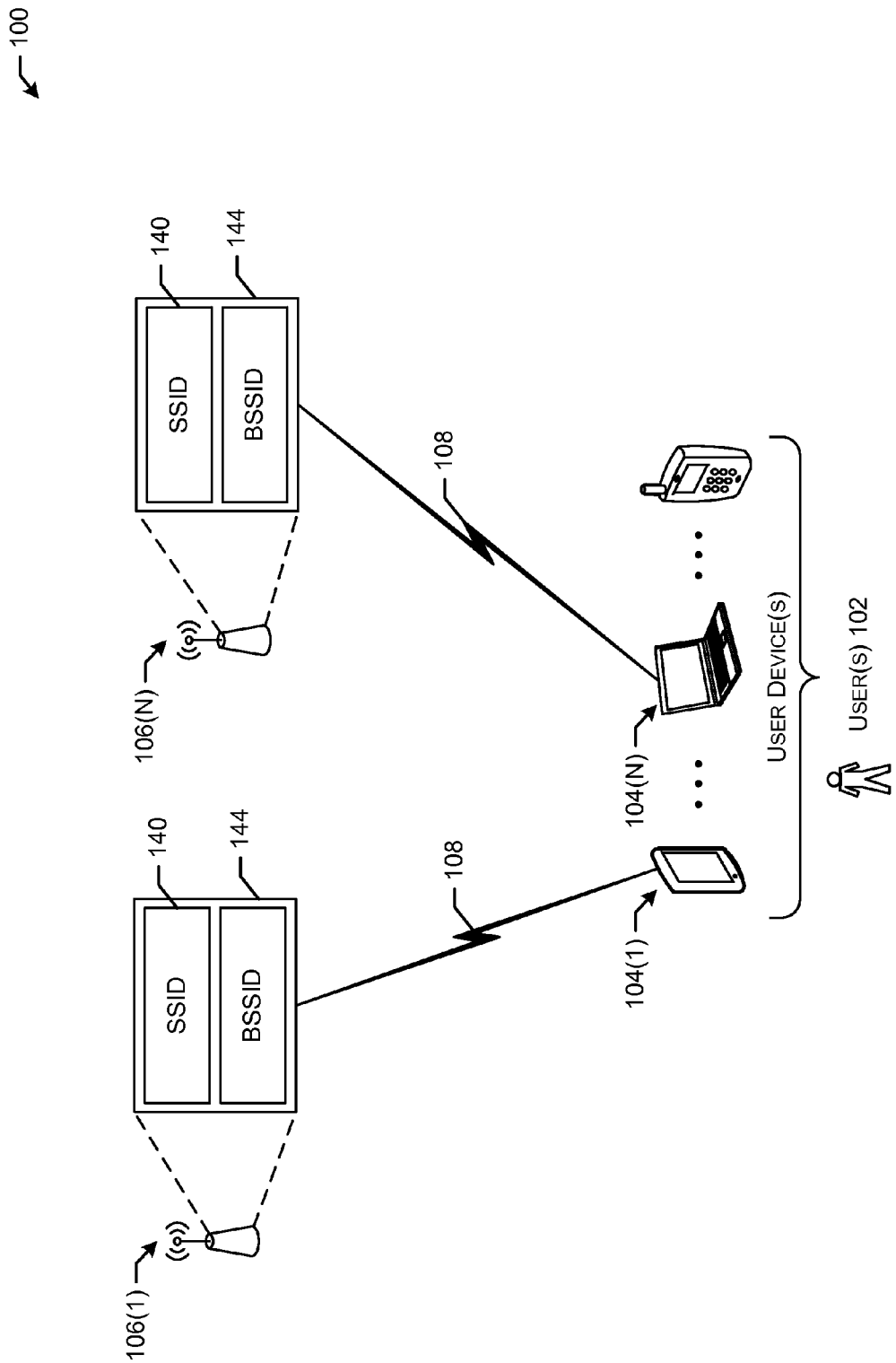
FIG. 1 depicts a schematic diagram of an example Wi-Fi SSID-based location learning and detection environment, incorporating location learning and detection electronic devices, in accordance with embodiments of the disclosure.

Embodiments of the disclosure are described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Embodiments of the disclosure may provide systems and methods for providing location information to an electronic device, such as a mobile communication device. The location information may be determined based at least in part on service set identifiers (SSIDs) and/or basic service set identifiers (BSSIDs) associated with wireless communication access points (APs), such as wireless fidelity (Wi-Fi) APs. Therefore, the electronic device may be configured to detect and identify APs in proximity of the electronic device, such as within radio range of the electronic device. In some cases, the electronic device may be further configured to establish a communicative link with one or more APs in proximity of the electronic device. In other cases, the electronic device may ascertain position and/or location information from a particular AP and its associated SSID and/or BSSID without establishing a communicative link with the AP. Location information may include, for example, a location name and/or identifier associated with a particular SSID, BSSID, or combination thereof. The location name and/or identifier may be, for example, a textual and/or numeric string that may identify particular ones of SSIDs and/or BSSIDs. In some embodiments, location information may include geo-location coordinates. Therefore, by detecting a proximal AP and determining the associated SSIDs and BSSIDs of the AP, the electronic device may identify at least one location identifier associated with the proximal AP. For example, if an electronic device is connected to an access point having a SSID and BSSID associated with the location information "WORK," then the electronic device may allow for all of the work-related files to be accessed on the device. In some cases, the electronic device may be able to determine a location identifier associated with a place based at least in part on detecting a plurality of APs and associated SSIDs and/or BSSIDs.

Further embodiments of the disclosure may provide for systems and methods for identifying locations based on SSIDs or BSSIDs. Locations may be identified by a location identifier that is associated with a set of access points and their associated SSIDs and BSSIDs. The set of access points associated with a location identifier may be determined based at least in part on temporal proximity, spatial proximity, and similarity in SSID values. For example, an electronic device may, at a first time reference, or point in time, scan an area for one or more initial access points (APs). Once, the electronic device scans the initial access points, the electronic device may identify, such as by retrieving and/or detecting beacons associated with each of the initial access points, SSID values and BSSID values associated with each of the initial APs detected at the initial time. The electronic device may retrieve previously identified locations if the initial BSSIDs associated with at least one of the initial access points are indicative of those previously identified locations. The electronic device may also assign a new location identifier to the SSID and BSSID values and/or a combination of BSSID values may be used by the electronic device to identify the location of the electronic device of the initial APs. In some cases, the BSSID values of the entire set or a subset of scanned access points may be used to identify a location. For example, if the detected APs are "WORK," "CAFÉ" and "OTHER," then this combination may be recognized as a location identifier of "WORK." The electronic device may also retrieve previously identified locations if the initial BSSIDs associated with each of the initial access points are indicative of those previously identified locations. In one aspect, the location and the associated location identifier may be determined by the electronic device only after observing a stabilization in the detected access points. In other words, the electronic device may make a determination of a location and associated location identifier, only after the electronic device has been in that location for a predetermined span of time.

If the electronic device, at a second time reference, or point in time, detects a new access point, then the new access point might be added to grow the location and associated location identifier. The electronic device might make the determination of whether to assign the same location identifier to the second access point based on the similarity of SSIDs. For example, if the electronic device is at a location with an associated SSID of "WORK," and the electronic device moves to a location, such that it picks up a new access point with an SSID of "WORK2," the electronic device may associate the new access point with SSID "WORK2" with the same location identifier as the one assigned to "WORK." In order to make this determination, the electronic device may detect a substantially similar SSID value between the new access point and one of the initial access points when they are in relative proximity to each other. In one aspect, it may be determined that the new access point and one of the initial access points are in relative proximity of each other if the signal strength of the initial access points is greater than a threshold level when the new access point is detected by the electronic device. In certain embodiments, the relative proximity of one or more access points may be decided based on detecting an overlap in the range, such as the radio coverage, of the one or more access points. In further embodiments, the new access point may be associated with the location identifier of the one or more initial access points, if the new access point is detected with a threshold time span of no longer detecting at least one of the one or more initial access points. In one example, if the electronic device reads "WORK" as the SSID from an access point, and again detects an access point with an associated SSID of "WORK2," within a relatively short predetermined time from each other, the electronic device may determine that these two access points are within a close enough range and/or temporal separation to allocate the same location identifier to both access points. In another example, if the electronic device is able to receive signals from both "WORK" and "WORK2," one can discern that because the electronic device is receiving both the signals simultaneously, they are within close proximity to each other. The electronic device might also make the determination of whether to assign the same location identifier to the second access point based on stability of the BSSIDs. If the device detects the second access point while still being able to detect the first access point, then the same location identifier may be assigned to these access points. Therefore, the access points associated with the particular location and associated location identifier may be increased. In one aspect, the location and the associated location identifier may be associated, by the electronic device, to the newly discovered access point only after observing a stabilization in either SSIDs or BSSIDs in the newly detected access points. In some embodiments, the electronic device may make a determination of associating the location identifier associated with the one or more initial access points, only after the electronic device has been in the range of the newly discovered access point for a predetermined span of time.

In certain embodiments, the identification of the location associated with a particular SSID and/or BSSID may entail accessing a location database containing information related to location identifiers and SSIDs and/or BSSIDs. In certain embodiments, the location database may map the SSIDs and/or BSSIDs to location names or identifiers. The location database may be stored on the electronic device or may be stored remotely from the electronic device. Alternatively, the location database may be stored both locally on the electronic device and remotely. In certain cases, the electronic device may be configured to interact with a user of the electronic device to receive and/or provide information pertaining to location names and associations to SSIDs and/or BSSIDs.

In further embodiments, the electronic device may be configured to learn a particular location and may be configured to associate location information such as a location identifier and/or name to the detected location and/or position. The electronic device may be able to learn a particular location by scanning the available APs and learning the location through recognition of the pattern of APs. Therefore, the electronic device may detect particular SSIDs and/or BSSIDs associated with APs and update the location database based at least in part on the SSID and/or BSSID, as well as an associated location identifier. In some cases, if the electronic device detects overlapping APs, where the radio range of the APs may geographically overlap, then the electronic device may determine that the overlapping APs and their SSIDs and/or BSSIDs may be associated with the same or substantially similar location information. In further aspects, the electronic device may be configured to detect APs with the same SSID, but different BSSIDs and then associate the APs with different BSSIDs to different location information. Further still, the electronic devices may be configured to receive user input, such as via a user interface associated with the electronic device, to associate a particular SSID and/or BSSID to particular location information. In one aspect, the electronic device may "learn a location," or otherwise allocate a particular SSID and/or BSSID to a corresponding location information when the electronic device detects a relative stability in the detected SSID and/or BSSID. In other words, the electronic device may effectuate the process of learning a location when the electronic device detects a dwell time in a particular SSID range for a predetermined number of times or a predetermined amount of time. In certain embodiments, the electronic device may be configured to learn a location, or otherwise associate location information with a particular SSID if the electronic device is in the presence of that SSID for a predetermined length of time.

In yet further embodiments, the electronic device, and/or individual application software running thereon, may have a location profile associated therewith. This location profile may be indicative of permissions and/or profiles to which the associated electronic device and/or application software may adhere. In one implementation, there may be provided a location services server configured to interact with the electronic device and/or associated application software to provide a location profile and/or permissions to the electronic device and/or application software running thereon for access to files and/or communicative links to other devices. Therefore, the location profiles may impart preferences, permissions, and/or restrictions on accessing data when in certain locations or when connected to APs having certain SSIDs and/or BSSIDS.

Embodiments of the disclosure may further include methods and/or processes to associate a location identifier to a newly discovered AP based upon knowledge of the location identifier of another AP. If it is found that a second newly discovered AP has a range and/or radio coverage area that overlaps with a first AP, then the second AP may be associated with a known location identifier associated with the first AP. Alternatively, a particular location identifier associated with one AP may be associated with another AP that shares the same or substantially similar SSID. In yet another alternative, a particular location identifier associated with one AP may be associated with another AP that shares the same or substantially similar SSID and has an overlap, at least in part, in radio coverage and/or range.

It will be appreciated that while the discussion herein may be directed particularly to wireless network detection, discovery, and/or establishment of a communicative connection therewith using one or more mobile electronic devices, the systems, methods, and apparatuses disclosed may be applied to non-mobile or stationary electronic devices within the scope and embodiments of the disclosure. It will further be appreciated that mobile electronic devices discussed herein may be operated in any suitable environment, location, or application, such as automotive applications, personal use, military use, commercial use, or the like. Further still, it will be appreciated that while much of the discussion herein may focus on WI-FI or direct WI-FI networks, the systems, methods, and apparatuses disclosed may be applied to any suitable wireless network, ad-hoc network, or point-to-point communicative link, operated at any suitable frequency, wavelength, modulation technique, pre-established standard, or protocol. Non-limiting examples of such wireless networks, point-to-point connections, or ad-hoc networks may include, but are not limited to: WI-FI, direct WI-FI, BLUETOOTH®, BLUETOOTH LOW ENERGY (BLE), cellular, THIRD GENERATION CELLULAR (3G), FOURTH GENERATION CELLULAR (4G), Long Term Evolution (LTE), Worldwide Interoperability for Microwave Access (WiMAX), or combinations thereof.

FIG. 1 is an example embodiment of a general overview of the low-power Wi-Fi SSID-based location learning and detection environment, incorporating location learning and detection electronic devices. It is increasingly important for mobile devices to be able to learn and recognize where they are physically taken and used. There may be a large and growing set of applications and services that currently use this type of information. Furthermore, the importance of having context-aware usages will allow for a mobile device to optimize its own performance based on its context. For example, a mobile device may determine whether a user is located at home or at work without having information with regard to the exact coordinates. If a mobile device ascertains its approximate location, such as work, home, public place or traveling, parameters may be set to control and restrict access. In one embodiment of this disclosure, it is possible to restrict the access of certain files in a mobile device based on the approximate location of a user. For example, if a user device 104(1)-104(N) is connected to an access point that has an SSID 140 associated with a public place, the user device 104 may restrict certain files from being viewed while the user device is connected to that SSID 140 to protect privacy or provide security.

Referring to FIG. 1, an example location learning and detection environment 100 according to embodiments of the disclosure may include one or more users 102 interacting with one or more user devices 104(1)-104(N) (collectively referred to herein as user devices 104). The user devices 104 may be configured to detect one or more available wireless access points (APs) 106(1)-106(N) (collectively referred to herein as APs 106) via one or more wireless links 108.

The users 102 may be individuals or other entities, such as corporations, non-profit organizations, for-profit organizations, government organizations, public sector organizations, or any of the aforementioned entities located in this country or foreign countries. The user device 104 may include, but is not limited to, a personal computer, a desktop computer, a notebook computer, a laptop computer, a personal digital assistant (PDA), an electronic book (ebook) reader, a tablet computing device, a pad computing device, a smart phone, or combinations thereof. As discussed above, the user devices 104 may include one or more user input interfaces to accept user 102 input. The user devices 104 may yet further include one or more user output interfaces, such as a display, a touch sensitive display, a speaker, a haptic output, or the like. The one or more user output interfaces on the user device 104 may be used by the user 102 to interact with applications and/or other instructions running on the user device 104, such as location aware applications or applications that provide location aware information, permissions, and/or services to the user 102 of the user device 104.

The APs 106 may be any suitable radio communication access point and/or base station configured to emit a suitable electromagnetic wave for unidirectional, bidirectional, and/or broadcast communications. In one aspect, electromagnetic or radio waves emitted from the AP may be modulated to carry information and/or communications thereon. The AP may be a wireless router or other wireless infrastructure, associated with, for example, Wi-Fi. Each of the APs may have an associated service set identifier (SSID) 140, as well as an associated Basic Service Set Identifier (BSSID) 144.

An SSID 140 may refer to and/or identify a wireless local area network (WLAN). The SSID 140 on access point(s) 106 may be set either manually by entering the SSID 140 into the client network settings, or automatically, by leaving the SSID 140 field unspecified or blank. A network administrator may utilize a public SSID 140 that is set on the access point 106 and broadcast to all wireless devices in range. The SSID 140 is an alphanumeric sequence of characters. Multiple APs 106 may share the same SSID. For example, if several APs 106 are controlled by the same entity, those APs 106 may share a common SSID. For example, if a corporation or university deploys multiple APs 106, then all of the SSIDs 140 deployed by that entity may share a common SSID 140. Alternatively, there may be any number of SSIDs 140 associated with the APs 106 of that entity. In certain embodiments, if an entity has more than one geographically or spatially separated location with APs 106 distributed across those locations, those APs 106 may share a common SSID 140. For example, a café with multiple locations may offer Wi-Fi services at each of its locations, and those APs 106 associated with the offered Wi-Fi service and the Basic Service Sets (BSSs) may have the same SSID 140 across the multiple locations. In this case, APs 106 may share a common SSID 140, but are not spatially overlapping in their coverage. In some cases, there may be SSIDs that are similar, but not exactly the same. Similar SSIDs may, in certain embodiments, have common alphanumeric segments. As an example, "CAFÉ-location-1" and "CAFÉ-location-2" may be considered similar SSIDs.

BSSID 144 may refer to a media access control (MAC) address of an AP 106 in an infrastructure mode basic service set (IBSS) [as defined by the IEEE 802.11-1999 wireless LAN specification standard]. This field may uniquely identify each BSS and AP. In an IBSS, the BSSID 144 may be a locally administered IEEE MAC address generated from a 46-bit random number. Indeed, multiple APs 106, each with unique BSSIDs 144, may share a common SSID 140.

Still referring to FIG. 1, the user device 104 may be configured to detect more than one accessible AP 106. In one aspect, the user device 104 may seek the one or more APs within radio range at either predefined time intervals or at random time intervals. Once the user device 104 identifies the accessible APs 106, the user device 104 may retrieve and/or receive the SSID 140 and/or BSSID 144 for one or more of the available APs 106. With certain APs 106, the SSID 140 and the BSSID 144 may be configured so that a user device 104 may retrieve and/or request them. The user device 104 may be configured to determine a location identifier, such as a location name and/or a label based on the retrieved SSID 140 and/or BSSID 144 associated with the APs 106.

The APs 106 may be spatially separated from each other at the different locations of the café. Therefore, in certain cases, a location identifier may identify each location of the café with a common location identifier and/or name, such as "COFFEEPLACE." Places may be identified by the BSSIDs of the APs. SSIDs 140 may be used to group multiple APs 106 that may be in close proximity, such that the user device 104 may receive a signal from these multiple APs 106. This grouping may be determined based on only the SSID associated with APs deployed at the various locations of the café, associating all of the APs with the café with the location identifier which represents the café. Alternatively, each location, or at least some locations, of the café may be identified individually. For example, an identifier of one location may be "COFFEEPLACE on Main Street." An identifier of another location may be "COFFEEPLACE on Peachtree Street." In this case, the identification of individual locations of the café may entail identification of the location based at least in part on both the SSID 140 and the BSSID 144. Without addressing every possible scenario, it will be appreciated that there may be a variety of situations where it may be advantageous to identify multiple locations of a common entity or identify each location individually. For example, in work places with many different offices across the world, it might be advantageous for a mobile device that travels between different locations in an office environment, for example, to be able to group all of these different access points by having a similar location identifier, such as "XYZ Company." Alternatively, it may be advantageous to uniquely identify each office, such as "XYZ Berlin," "XYZ Beijing," and "XYZ New York." In one aspect, the user device 104 may access a location database stored on the user device 104 to determine a location identifier and/or location name based at least in part on the SSID 140 and/or the BSSID 144.

The user device 104 may further be configured to determine if the user device 104 is in motion between APs 106 or is at rest within the radio range of one or more APs 106, based on the changes to detected APs and associated SSID 140 and/or the BSSID 144. When the user device 104 is not in motion or not outside of the range of APs with a common SSID for a predetermined period of time, the user device 104 may be configured to learn the location associated with the detected SSID 140. In one example, the user device 104 may learn patterns of associated SSIDs 140 and BSSIDs 144 and associate a location identifier. In one aspect, the user device 104 may be configured to accept user input, such as via one or more user interfaces on the user device 104 to identify the SSID 140 where the user device 104 dwells for a predetermined period of time. The user device 104 may, in one aspect, update the location database based on the user input.

Still referring to FIG. 1, once the user device 104 determines a location identifier based on the SSID 140 and/or the BSSID 144, the user device 104 may further be configured to communicate the location identifier to other devices such as servers.

The user device 104 may further be configured to receive preferences or access restrictions based on the location identifier identified by the user device 104. These preferences and/or access restrictions may be received as location profile identifying rules, protocols, and/or access levels associated with the user device 104 and/or application software running thereon. For example, if the location identifier identified by the user device 104 is determined to be a public place, the user device 104 may restrict access of certain confidential and/or sensitive files while the device is in the public place. Therefore, the user device 104 may store location profiles associated with particular user devices 104 and/or application software executed on the user device 104.

Figure 2:
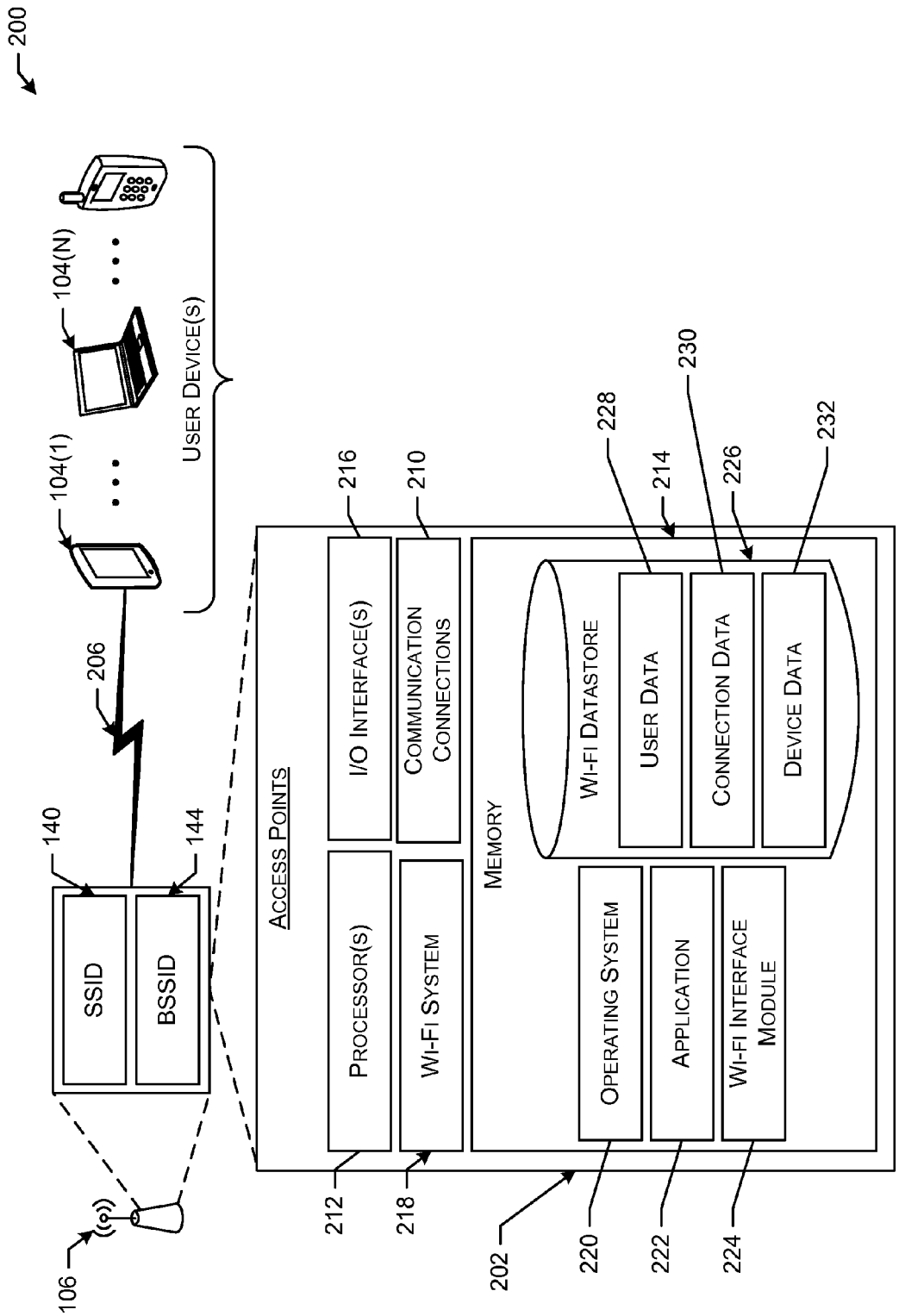
FIG. 2 depicts a schematic block diagram of a representative access point to establish a wireless connection included in the location learning and detection environment of FIG. 1, in accordance with embodiments of the disclosure.

FIG. 2 illustrates a block diagram of a representative AP 106 configured to establish a wireless connection. In one embodiment, the AP 106 may contains one or more computer processors 212 to execute computer-readable instructions stored in memory 214. The one or more computer processors 212 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The AP 106 may also include a chipset (not shown) for controlling communications between the one or more processors 212 and the one or more of the other components of the computing device 202. In certain embodiments, the AP 106 may be based on an Intel® Architecture system, and the processor(s) 212 and chipset may be from a family of Intel® processors and chipsets, such as the Intel® Atom® processor family. The one or more processors 212 may also include one or more application-specific integrated circuits (ASICs) or application-specific standard products (ASSPs) for handling specific data processing functions or tasks.

The AP 106 may also include an I/O interface 216 which may include a variety of elements that enable the display of content and/or receiving user inputs. For instance, the I/O interface 216 may include a display, a keyboard, a mouse, a touch screen display, a voice recognition interface, a motion recognition interface, and/or a touchpad.

The AP 106 may also include a wireless (Wi-Fi) system 218 that includes the hardware and software to broadcast and receive messages either using the Wi-Fi Direct Standard (See, Wi-Fi Direct specification published in October 2010) and/or the IEEE 802.11 wireless standard (See, IEEE 802.11-2007, published Mar. 8, 2007; IEEE 802.11n-2009, published October 2009) or a combination thereof. The Wi-Fi system 218 may include a transmitter and a receiver or a transceiver (not shown) capable of operating in a broad range of operating frequencies governed by the 802.11 wireless standard.

In one embodiment, the memory 214 may store a variety of modules to operate the device and provide various aspects of functionality that are common to mobile devices. For example, an operating system 220 may provide file management capability, interpret user inputs, and manage the resources on the computing device 202. The operating system 220 may provide the computer processor 212 with a variety of instruction sets to perform mathematical or logic operations that enable the functionality of the display and other sensory elements that present content to, or receive content from, the user. The memory 214 may also store one or more applications 222 that perform a variety of tasks or operations on the computing device 202 or that may perform tasks in conjunction with other user devices 104 via a communication connection 210. For instance, the application 222 may include a browser, a GPS device, a word processor, a database interface, an audiovisual player, or a task-specific application that queries other user devices 104 for information requested by the AP 106 and/or information needed to perform specific tasks on the user devices 104.

The memory 214 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read-only memory (EEPROM), non-volatile RAM (NVRAM), universal serial bus (USB) removable memory, or combinations thereof.

In this embodiment, the AP 106 may also include a wireless (Wi-Fi) interface module 224 that can act as an intermediary between the application 222 and the Wi-Fi system 218. The Wi-Fi interface module 224 may enable the application 222 developers to utilize the Wi-Fi system 218 without knowing the specific techniques and technology of the Wi-Fi system 218. For example, as the Wi-Fi system 218 is upgraded or optimized over time, the way in which the application 222 interfaces with the Wi-Fi system 218 may not need to change in order to use the improved or upgraded wireless capabilities.

The AP 106 may include a wireless (Wi-Fi) datastore 226 that logs wireless system operations and performance. In this embodiment, the Wi-Fi datastore 226 may include a user data module 228, a connection data module 230, and a device data module 232. The user data module 228 may record user data on the AP 106 as well as the user data from other user devices 104 that are exchanging data with the access point. The connection data module 230 may record a historical record of wireless connection performance and capability. Lastly, the device data module 232 may store device information or configurations of the user devices 104 that are exchanging information over the wireless connections (communication connections) 210. The Wi-Fi interface module 224 can use the data described above to optimize the initiating process of the Wi-Fi system 218. The optimization concepts will be discussed in greater detail below.

In one embodiment, the wireless interface module 224 operates to reduce the amount of interaction between the application 222 and the Wi-Fi system 218 during the establishment of a wireless connection between the access point and one or more of the other user devices 104. In one example, the Wi-Fi interface module 224 receives a connection request from the application 222 or the other user devices 104 and establishes the wireless connection with minimal interaction from the application 222. Hence, the application 222 can establish a wireless connection without detailed knowledge of wireless standards, equipment, or capability. Minimal application interaction can include sending a connection request to the wireless interface module 224 and receiving a confirmation that the WI-FI connection 206 is enabled and ready for use by the application 222.

Still referring to FIG. 2, in another embodiment, the wireless connection 206 can be established using the Wi-Fi Direct standard. Under this standard, the AP 106 can be in one of the following states: discoverable mode, group owner mode, or station mode. In the discoverable mode, the AP 106 can discover other devices and is ready to connect with other devices over a wireless connection. Group owner mode is when the AP 106 is connected to one or more user devices 104 and is available to connect with other devices that want to join the group. In this mode, the AP 106 is the group owner and operates as an access point or "hot spot" for the other devices on the network. When the AP 106 is in the station mode, the device is connected to a group owner device that is acting as an AP for the group. While in the station mode, the device is not typically connected with any other device directly. Wi-Fi Direct devices are symmetric and can be in any of these three modes. Hence, the way in which the WI-FI interface module 224 can establish a connection between devices can vary depending on the current mode or state of the device. Therefore, the Wi-Fi interface module 224 can monitor or determine the states of the AP 106 that may be in range of the user device 104 and use that information to determine if a wireless connection should or can be initiated. For example, if the AP 106 is in the station mode, the Wi-Fi interface module 224 will not attempt to establish a connection with that AP 106. However, if the AP 106 is in the group owner mode or the discoverable mode, the Wi-Fi interface module 224 will direct the Wi-Fi system 218 to attempt a wireless connection with the AP 106.

Figure 3:
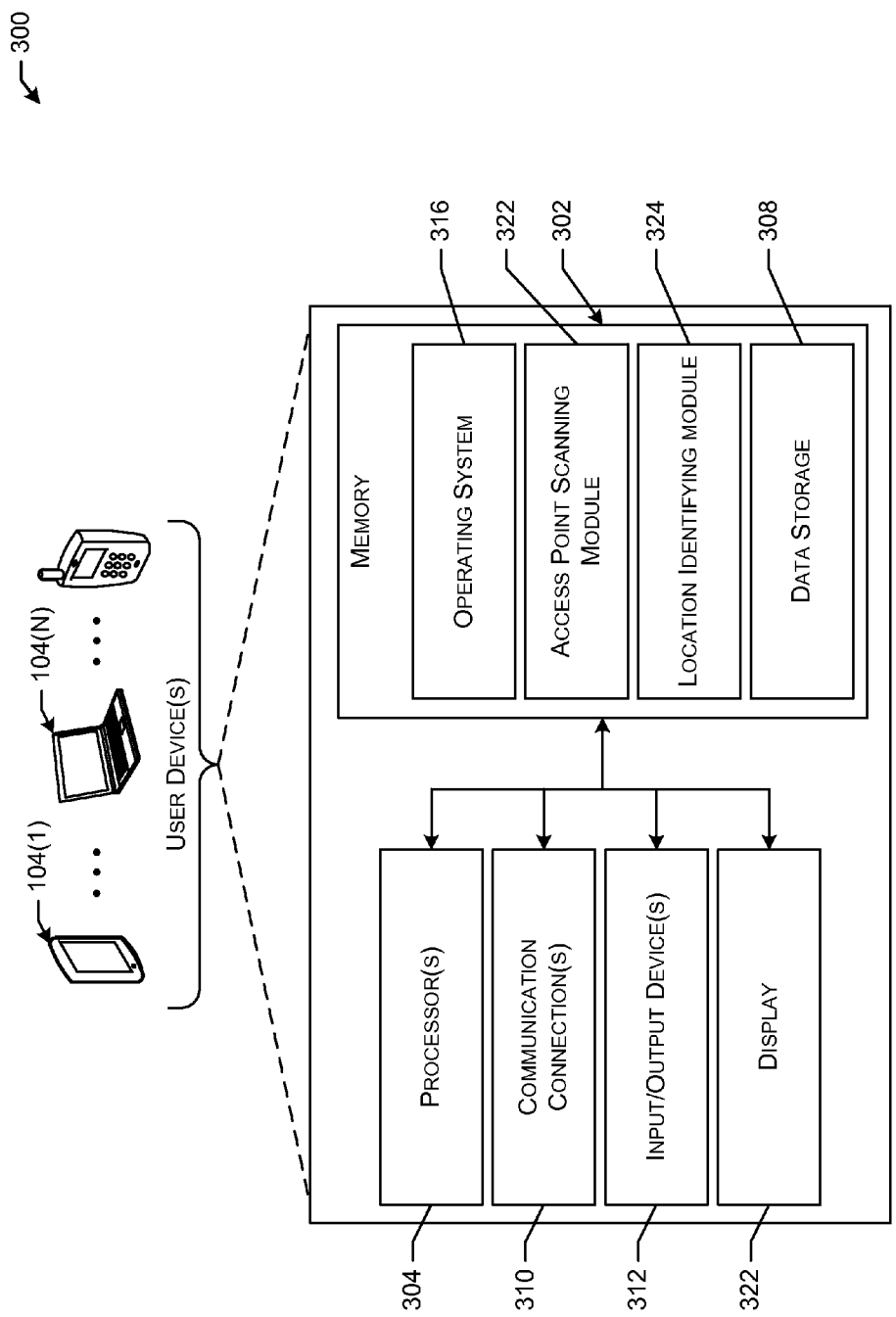
FIG. 3 depicts a schematic block diagram of an example user device configured to be operated in accordance with embodiments of the disclosure.

FIG. 3 depicts a schematic block diagram of an example user device. The user device 104 may include one or more processors 304 (referred to collectively as processor 304) communicatively coupled to one or more electronic memories 302 (referred to collectively as memory 302). The user device 104 may further include one or more input devices/output devices 312, such as a keyboard, a mouse, a pen, a voice input device, a touch input device, printers, a speaker, or display screen 322.

The memory 302 may include any number of suitable memory devices, such as caches, read-only memory devices, random access memory (RAM), flash memory devices, electrically erasable programmable read-only memory (EEPROM), non-volatile RAM (NVRAM), universal serial bus (USB) removable memory, magnetic storage devices, removable storage devices (e.g., memory cards, etc.), and/or non-removable storage devices (these collectively are referred to as data storage 308). In certain embodiments, the user devices 104 may include one or more chips that include both processing and memory components. As desired, the memory 302 may include internal memory devices and/or external memory devices. The memory 302 may store data, executable instructions, and/or various program modules utilized by the processor 304. Examples may include any number of suitable program modules and/or applications such as music files, audio files, or video files, among others.

The memory 302 may include an operating system 316 to manage and execute applications stored therein as well as other systems and modules within the user device 104. For example, the user device 104 may include a display screen 322 that enables a user to view content displayed by the device or to interact with the user device 104 using various tactile responsive interfaces such as a keyboard, a display screen, a touch screen, and/or a mouse. The operating system 316 may also interface with the communication connections 310, such as network interface modules. The communication connection 310 may include a wireless system (not shown) that may enable the user device 104 to communicate wirelessly with the other devices and servers. The wireless system may include the hardware and software to broadcast and receive messages either using the Wi-Fi Direct Standard (See, Wi-Fi Direct specification published in October 2010) and/or the IEEE 802.11 wireless standard (See, IEEE 802.11-2007, published Mar. 8, 2007; IEEE 802.11n-2009, published October 2009) or a combination thereof. The wireless system may include a transmitter and a receiver or a transceiver (not shown) capable of operating in a broad range of operating frequencies governed by the IEEE 802.11 wireless standards.

Still referring to FIG. 3, the access point scanning module 322 may include one or more instructions and/or executable program code in certain embodiments. The instructions stored in the access point scanning module 322, when executed by the processors 304, may enable the processors 304 to scan for available APs 106 in the vicinity of the user device 104. In one aspect, the APs 106 detected by the user device 104 during the scanning may be within radio range of the user device 104. In another aspect, the scanning for APs may involve the user device 104 seeking or "listening for" a beacon or other handshaking data packet and/or protocol transmitted by a proximal AP 106. The location identifying module 324 may determine location based on the location identifier for the AP 106. This module retrieves the access point's SSID 140 and the BSSID 144, and it may compare the BSSID 144 and/or the SSID 140 for the retrieved AP 106 with other location identifiers that the user device 104 has already identified in previous iterations. If the SSID 140 retrieved from the current AP 106 matches or is substantially similar to the SSID 140 retrieved from a previously identified AP, the location identifying module 324 may add the location identifier associated with the previously associated AP to the current AP 106. However, if the SSIDs 140 does not match, the location identifying module 324 may determine a new location identifier for the AP 106.

Figure 4:
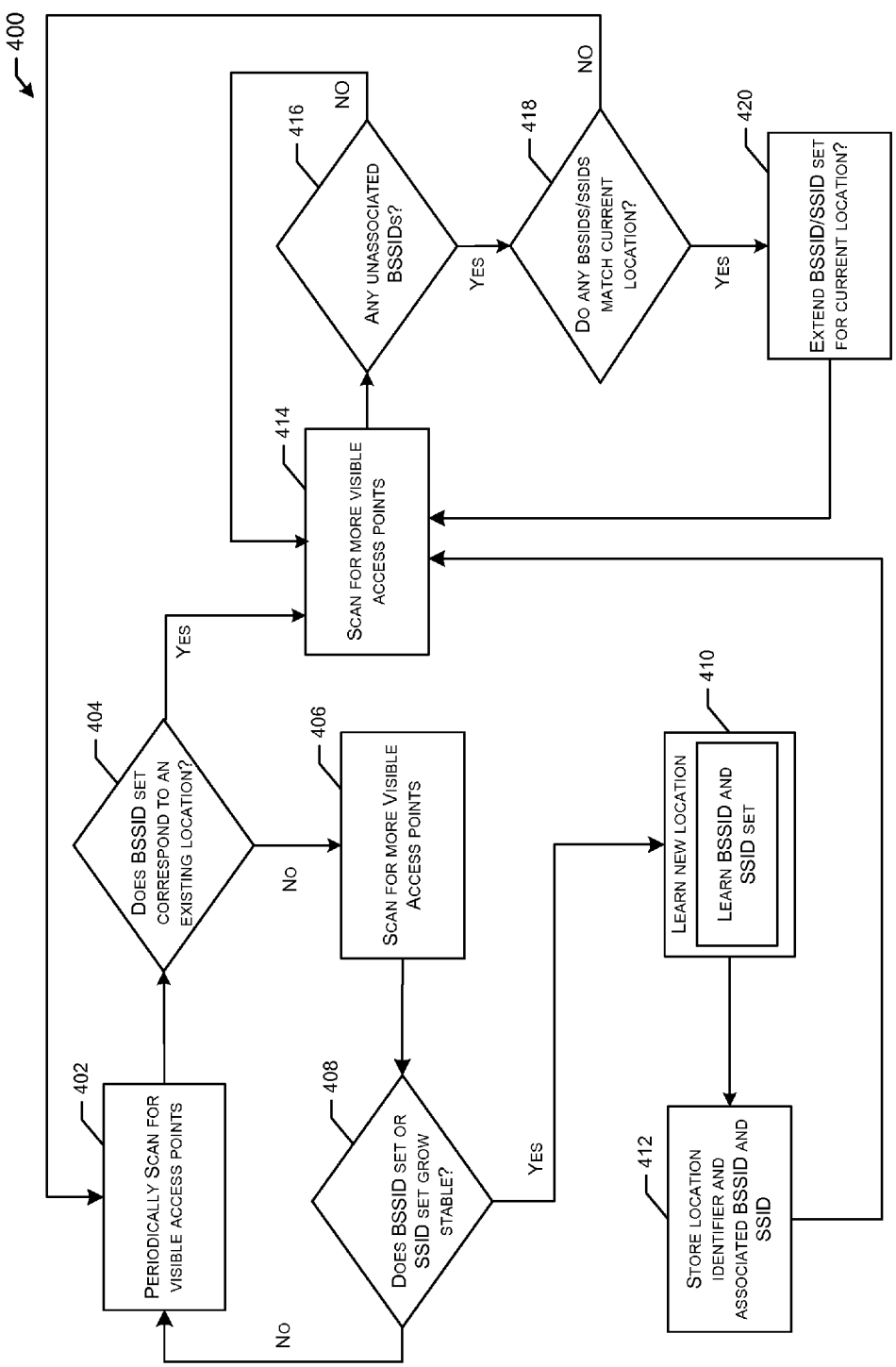
FIG. 4 is a flow diagram of an example method for learning and detecting a position, in accordance with embodiments of the disclosure.

FIG. 4 is a flow diagram of an example method 400 for learning and or detecting a WI-FI based location. In one aspect, the method 400 may be performed by the user device 104. The user device 104, at block 402, may scan for APs 106 within radio range of the user device 104, so as to be detectable by the user device 104. The SSID 140 and/or the BSSID 144 of the detected APs 106 may further be determined by the user device 104. In one embodiment, the user device 104 may scan for visible and/or detectable APs 106 at a set time interval or at a predetermined time. In some cases, the scans and/or the detection may be synchronized with a universal time, such as a universal time clock (UTC) time. Alternatively, the user device 104 may scan for detectable APs 106 randomly or as soon as it disassociates from a previously associated AP 106. For example, if a user device 104 is connected to the APs 106, the user device 104 could remain in "stationary mode," as long as the user device 104 is in the wireless range of the AP(s) 106. However, if the user device 104 becomes disconnected from the wireless AP 106, such as by no longer being within the coverage range of that AP 106, the user device 104 may scan for one or more new APs 106. In one aspect, the determination of the SSID 140 and/or the BSSID 144 of the detected AP 106 may entail the user device 104 sending a query or request message, or both, to the AP 106 to receive information associated with the SSID 140 or the BSSID 144, or both.

At block 404, it may be determined if the currently scanned BSSIDs 144 of the detected APs 106 correspond to an existing location. In one example, the user device 104 may compare the BSSID 144 of the currently detected APs 106 to BSSIDs 144 corresponding to previously learned APs 106, associated with an existing location. If at block 404, it is determined that the BSSIDs 144 of the in-range APs 106 are not mapped to an existing location, then at block 406, the user device 104 may scan further for more APs and identify SSIDs 140 and BSSIDs 144 for the new APs 106. In one aspect, the determination of the SSID 140 and/or the BSSID 144 of the detected APs 106 may entail the user device 104 sending a query or a request message, or both, to receive information associated with the SSID 140 and/or the BSSID 144. In one aspect, the SSID 140 and/or the BSSID 144 may be identified by receiving a beacon from the AP 106 carrying the SSID 140 and/or the BSSID 144 information.

At block 408, it may be determined if the set of SSIDs 140 and/or BSSIDs 144 of the detected APs 106 is stable. In other words, it may be determined if the user device 104 is within the range of a particular AP 106 or a set of APs 106 for a predetermined span of time. Therefore, there may be a temporal threshold associated with the determination of whether the user device 104 is in one location or otherwise in the radio vicinity of a single AP 106 or a set of APs 106. BSSID 144 stability may indicate a lack of motion or motion within a small area bounded by the range of the AP signal. For example, if a user device 104 is moving within a building where the building and associated APs 106 may be associated with the location identifier "WORK," the same set of APs may be detected from all points throughout the building. SSID stability may indicate motion within a larger area within which there may exist APs that have all been configured with the same SSID. For example, such a situation may occur on a company campus where the APs are all configured with a single SSID. The use of both BSSID stability and SSID stability allows the device to identify both small locations (surrounding a small set of APs) and larger logically related locations such as, for example, a company campus. In one aspect, non-stability of the SSID 140 and/or BSSID 144 set may indicate movement or motion of the user device 104. For example, if the user 102 and associated user device 104 are in motion, the detectable APs 106 may be visible for a certain period of time while the user device 104 is in the range of the AP 106. If there is not an indication of relative SSID 140 and/or BSSID 144 set stability or relative non-movement of the user device 104, such as by detecting a dwell time greater than the temporal threshold level, the method 400 may return to block 402, where the user device 104 may continue to scan for APs 106.

If at block 408, the SSID 140 and/or BSSID 144 are determined to be stable, then a new location may be associated with the SSID 140 and/or BSSID 144 by the process of learning. In one aspect, the user device 104 may designate a collection of APs 106 as a "new location" and attach a new location identifier to these scanned APs 106 in operations at block 410. The SSIDs 140 and BSSIDs 144 associated with the APs 106 that are currently unassociated with a location identifier may, at block 410, be associated with a location identifier. In this case, there may be a single AP 106 with a single SSID 140 and a single BSSID 144, multiple APs 106 sharing a single SSID 140 and with each AP 106 having a unique BSSID 144, or multiple APs each having a different SSID 140 and a unique BSSID 144. In certain embodiments, the location identifier may be one of "PUBLIC," when the currently detected SSID 140 and/or BSSID 144 are not recognized by the user device 104. Furthermore, in certain embodiments, the system may also use a geo-location technology and/or database to determine the geo-location of a place. Alternatively, the user device 104 may assign an identifier based on an internal identification such as an SSID 140 name or BSSID 144. In certain other embodiments, the user device 104 may solicit a location identifier from the user 102 to associate with the SSID 140 and/or the BSSID 144 of the currently detected AP 106.

At block 412, the location identifier as ascertained at block 410 may be stored in a database to allow the device to identify this location in the future. For example, if a user device 104 returns to the particular place associated with the APs 106, the user device 104 may scan the APs 106. When the user device 104 recognizes the APs 106, the user device 104 may retrieve the location identifier associated with the APs 106.

Still referring to method 400 of FIG. 4, if at block 404, it is determined that the BSSID 144 set is mapped to an existing location, then at block 414, the user device 104 may continue to scan for APs 106 and identify associated SSIDs 140 and BSSIDs 144, such as, for example, if a user device 104 maintains a connection with an AP 106 or scans for more SSIDs 140 and BSSIDs 144.

At block 416, it may be determined if any additionally detected APs 106 and associated SSIDs 140 and/or BSSIDs 144 are unassociated with the current location. If, at block 416, it is determined that all additionally detected BSSIDs 144 associated with APs 106 are associated with the current location identifier, then the method 400 may return to block 414 to continue to scan for additional APs 106 and associated SSIDs 140 and BSSIDs 144.

If, however, at block 416, it is determined that some of the additionally detected APs 106 are unassociated, then the user device 104, at block 418 may determine whether any of the detected APs 106 are associated with the current location identifier. If it is determined that none of the SSIDs 140 and the BSSIDs 144 observed are assigned to the current location, then it is determined that the user has left the current location and the method 400 may return to block 402 and scan APs 106 for periods of SSID and/or BSSID stability. If at block 418 it is determined that some of the observed BSSIDs 144 are associated with the current location, the device may extend the set of SSIDs 140 and BSSIDs 144 associated with the current location at block 420 and continue to scan for APs 106 at block 414. In one aspect, the determination of whether the detected AP 106 of block 414 should be associated with the AP 106 detected at block 404 may depend on a variety of factors. For example, the overlap of the range, such as the radio range of APs, may be considered when associating newly found APs 106 to a known location identifier. In some cases, a location identifier may be associated with a newly discovered AP 106 if the newly discovered AP 106 shares a common SSID 140 with another AP 106 having that particular location identifier associated therewith. In yet other cases, a location identifier may be associated with a newly discovered AP 106 if the newly discovered AP 106 shares a common SSID 140 with another AP 106 having that particular location identifier associated therewith, and there is an overlap in the area of coverage between the two APs 106.

At block 420, the newly associated location identifiers and SSID 140 and/or BSSID 144 may be stored on the device as part of the definition of the current location. As a result of updating the location information, the user device 104 may upon seeing the newly added SSID 140 or BSSID 144 in the future determine in block 404 that the user is in the current location. At block 420, the new AP may be associated with the location identifier that was assigned to this location in block 410 and may be stored in a database to allow the device to identify this location in the future.

It should be noted that the method 400 may be modified in various ways in accordance with certain embodiments of the disclosure. For example, one or more operations of the method 400 may be eliminated or executed out of order in other embodiments of the disclosure. Additionally, other operations may be added to the method 400 in accordance with other embodiments of the disclosure.

Figure 5:
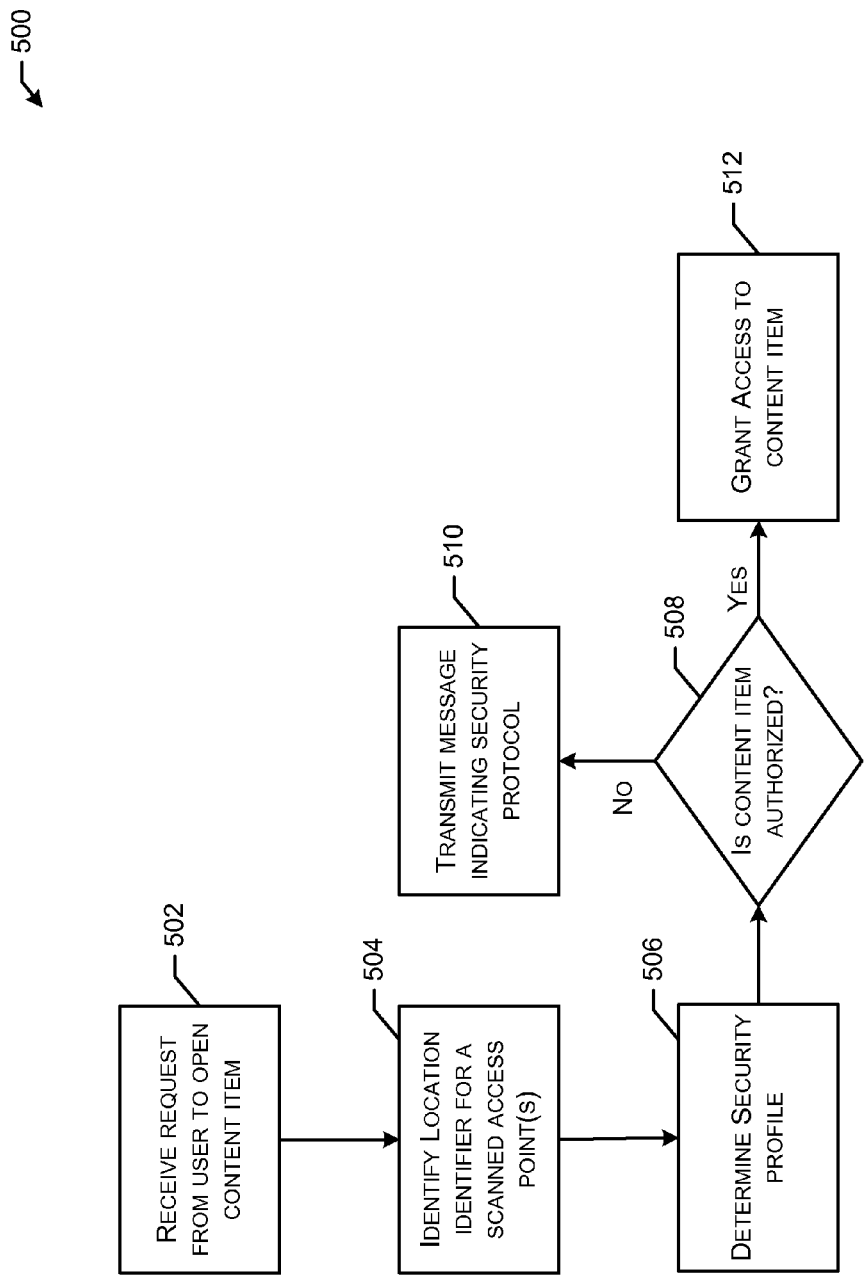
FIG. 5 is a flow diagram of an example method for location aware content access, in accordance with embodiments of the disclosure.

Referring now to FIG. 5, an example method 500 is described for restricting access to content stored on the user device 104 and/or content accessible by the user device 104 based at least in part on a location identifier of the user device 104. At block 502, the user device 104 may receive a request from the user 102 to open content. The content may include data, a file, an application, a program, or online media and/or content. The received request may be via one or more input/output devices 312 associated with the user device 104. In one non-limiting example, the user 102 may click on a file icon, displayed on the display screen 322 and representing an application that may be available on the user device 104, to open or launch the application. In another non-limiting example, the user 102 may attempt to open a file located on a remote server on the user device 104.

At block 504, when the user device 104 receives the request for content, the user device 104 may determine or identify the current location identifier associated with the present location of the user device 104. The current location identifier may be based at least in part on the APs 106 within radio range of the user device 104 as identified by corresponding SSIDs 140 and/or BSSIDs 144. At block 506, a security profile may be identified. The security profile may be based on the current location identifier in one aspect. For example, the user device 104 may store location identifiers and the associated security profile locally on the user device 104. In certain embodiments, the user device 104 may retrieve the security profile associated with the location identifier from a location server. In certain embodiments, the security profile may be further based at least in part on the user device 104 in addition to the current location identifier. In yet further embodiments, there may be a security profile associated with one or more individual content, applications, and/or files on the user device 104. At block 508, the user device 104 may determine, based at least in part on the security profile, if the requested content is authorized. In other words, the user device 104 may determine if the content is currently authorized on the user device 104. This determination may be made by the processors 304 of the user device 104.

If it is determined at block 508 that the content is not authorized based at least in part on the security profile, then at block 510, a message may be transmitted indicating noncompliance with the security profile. Otherwise, at block 512, access to the content may be allowed.

As a non-limiting example of the method 500, consider situations where the user device 104 may have access to files associated with a particular location server, such as a server associated with one's employer. A server may set security profiles that would prevent the user device 104 from accessing files when the user device 104 is not associated with an access point with a location identifier that the employer location server deems secure. For example, if a user device 104 is associated with an access point that has a location identifier such as a "PUBLIC PLACE," the security profile may prevent the user device 104 from accessing files from its present location and/or present Wi-Fi access point. It will be appreciated, therefore, that the method 500 may be implemented to secure sensitive and/or confidential material by controlling access to this information based at least in part on the location from which an attempt is made to access the content.

It should be noted that the method 500 may be modified in various ways in accordance with certain embodiments of the disclosure. For example, one or more operations of the method 500 may be eliminated or executed out of order in other embodiments of the disclosure. Additionally, other operations may be added to the method 500 in accordance with other embodiments of the disclosure.

Figure 6:
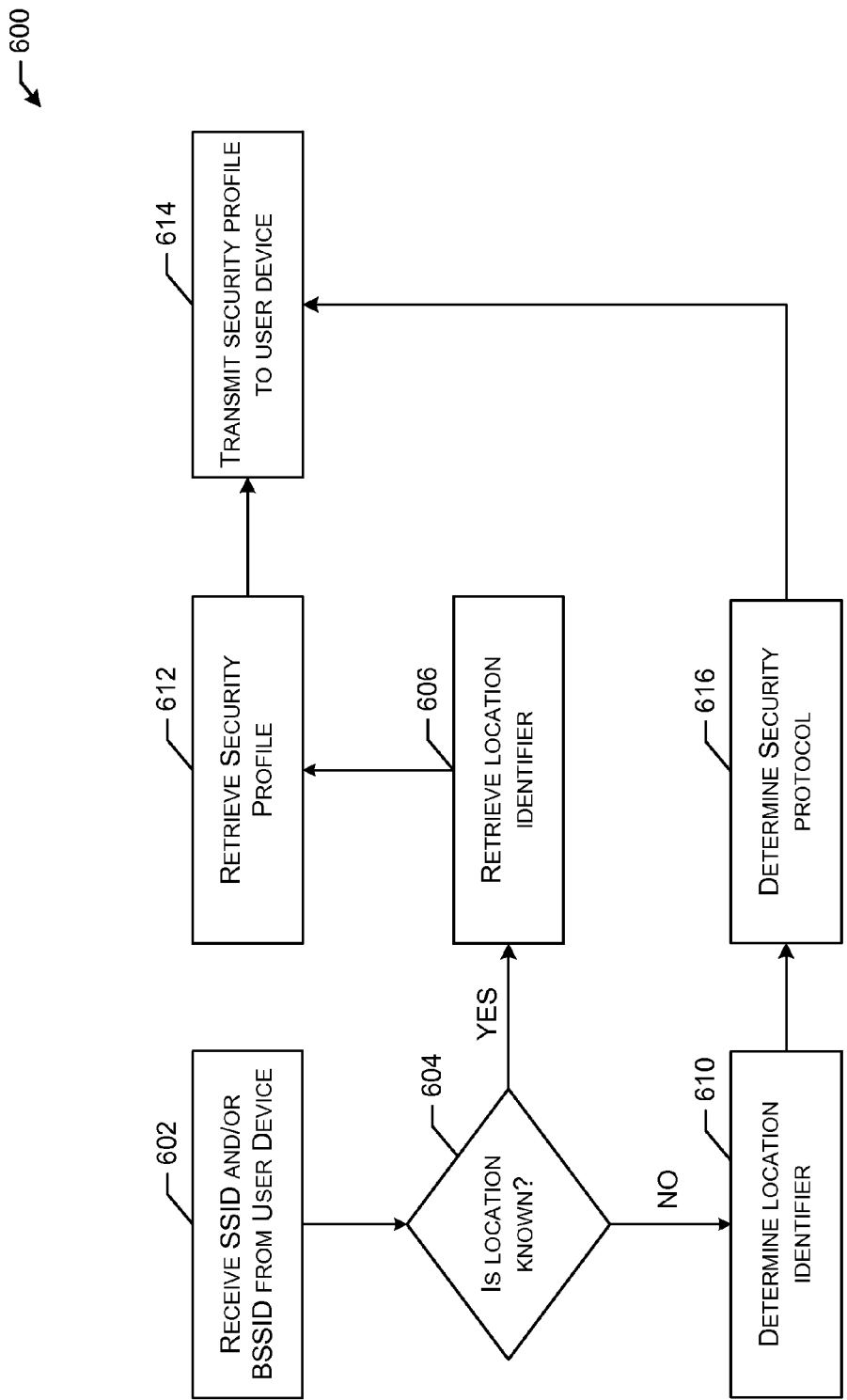
FIG. 6 is a flow diagram of an example method for providing a security profile to a user device, in accordance with embodiments of the disclosure.

FIG. 6 describes an example method 600 in which the location server restricts access to data contained on the user device 104 when the user device 104 is associated with an access point and a certain identifier. At block 602, a server may receive a set of SSIDs 140 and BSSIDs 144 associated with one or more APs 106 available at the position of the user device 104. At block 604, the server may determine if the one or more APs 106 are associated with any known location identifier. Therefore, the server may retrieve and compare access points and location identifiers associated therewith that may be retrieved from other users 102 or previously from this user device 104 from a database. If at block 604, the location server determines that the currently scanned APs 106 are associated with a known location identifier, the location server may retrieve a location identifier at block 606 from the user device 104.

Based at least in part on the retrieved location identifier, at block 612, a security profile may be identified. At block 614, the identified security profile may be transmitted to the user device 104. If at block 604 it is determined that the location identifier is not known, then at block 610, a location identifier may be determined. The location identifier may be determined based at least in part from the user device 104 and the associated processor 304 associating a location identifier to the AP 106. This association may, in certain embodiments, entail user 102 input as discussed with reference to the method 400 of FIG. 4. At block 616, in one embodiment, the location server may determine the security profile associated with the location identifier. This could be predetermined based on a list of location identifiers previously identified by other users 102 and user devices 104 and an associated security profile. Alternatively, a network administrator for the location server could manually set a security profile for each of the location identifiers.

Figure 7:
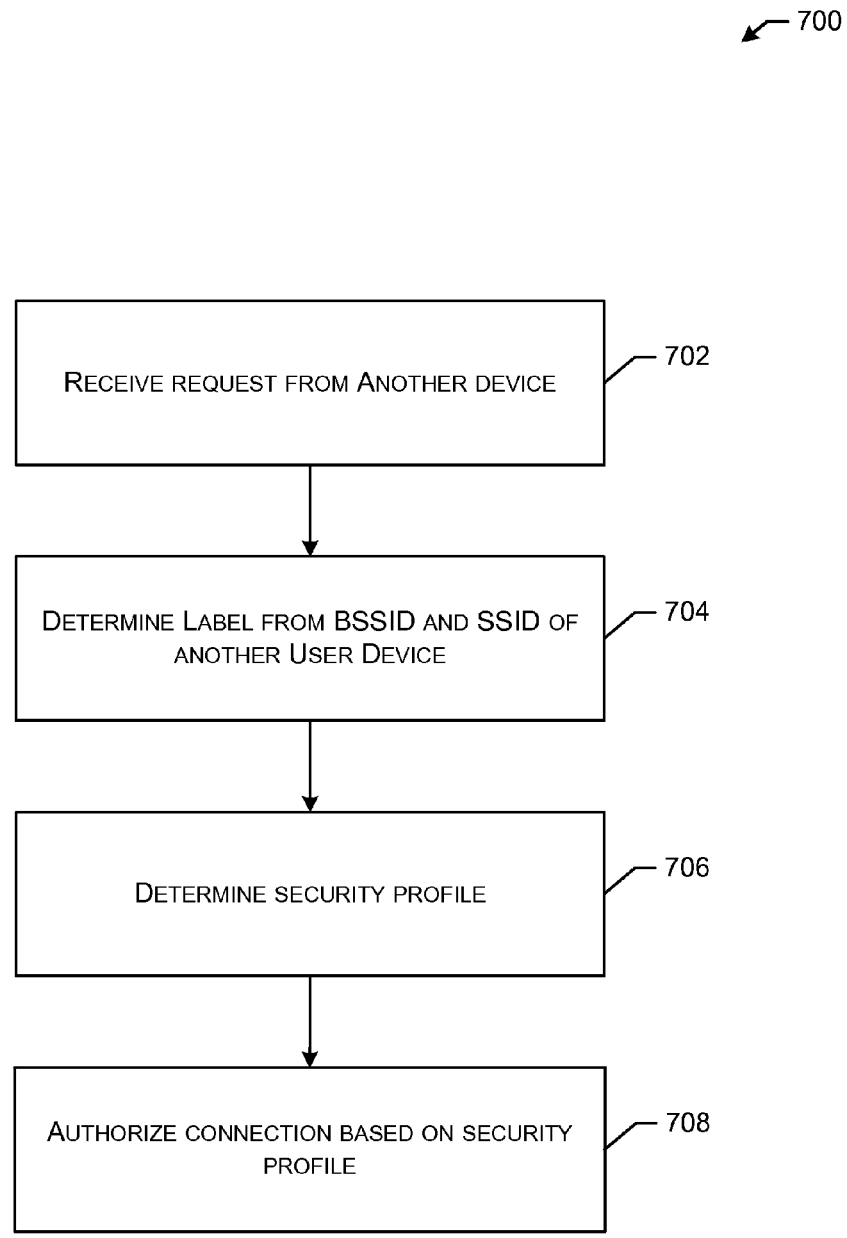
FIG. 7 is a flow diagram of an example method for establishing a location aware wireless communicative connection, in accordance with embodiments of the disclosure.

Referring to FIG. 7, an example method 700 for establishing a communicative link based at least in part on a security profile is discussed. At block 702, the user device 104 may request from another user device to establish a communicative connection with a second user device. At block 704, the user device 104 may retrieve the location identifier based on the SSIDs 140 and/or BSSIDs 144 which it has been observing. At block 706, the user device 104 may retrieve the security profile associated with the location identifier. This could either be preprogrammed based on a list of location identifiers previously identified by the user device 104 and an associated security protocol. Alternatively, a network administrator may manually set a security profile for each of the location identifiers. At block 708, the user device 104 may authorize the connection between itself and the other user devices 104 based at least in part on the security profile. For example, if both of the user devices 104 have a security protocol such that they are allowed to connect to each other, then the user device 104 may allow the other device to connect to it to form a peer-to-peer connection, such as Wi-Fi Direct.

Embodiments described herein may be implemented using hardware, software, and/or firmware, for example, to perform the methods and/or operations described herein. Certain embodiments described herein may be provided as a tangible machine-readable medium storing machine-executable instructions that, if executed by a machine, cause the machine to perform the methods and/or operations described herein. The tangible machine-readable medium may include, but is not limited to, any type of disk including floppy disks, optical disks, compact disk read-only memories (CD-ROMs), compact disk rewritables (CD-RWs), magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device, or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions, which have been employed herein, are used as terms of description and not of limitation. In the use of such terms and expressions, there is no intention of excluding any equivalents of the features shown and described (or portions thereof), and it is recognized that various modifications are possible within the scope of the claims. Other modifications, variations, and alternatives are also possible. Accordingly, the claims are intended to cover all such equivalents.

While certain embodiments of the disclosure have been described in connection with what is presently considered to be the most practical and various embodiments, it is to be understood that the disclosure is not to be limited to the disclosed embodiments, but on the contrary, is intended to cover various modifications and equivalent arrangements included within the scope of the claims. Although specific terms are employed herein, they are used in a generic and descriptive sense only, and not for purposes of limitation.

This written description uses examples to disclose certain embodiments of the disclosure, including the best mode, and to enable any person skilled in the art to practice certain embodiments of the disclosure, including making and using any devices or systems and performing any incorporated methods. The patentable scope of certain embodiments of the disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:

identifying a first access point, by a mobile device having at least one processor, wherein the first access point is associated with a first basic service set identifier (BSSID) value and a first service set identifier (SSID) value, wherein the first access point is associated with a known location identifier;

identifying one or more second access points, by the mobile device, wherein each of the one or more second access points are associated with a second BSSID value and a second SSID value;

determining, by the mobile device, that the one or more second access points are not associated with the known location identifier; and associating, by the mobile device and based at least in part on determining that the one or more second access points are not associated with the known location identifier, a new location identifier with the first access point and the one or more second access points;

wherein associating the known location identifier further comprises associating the location identifier based at least in part on determining that at least one of the one or more second SSID values and the first SSID value are similar;

wherein a first time reference and a second time reference are within a predetermined range of each other, wherein the first time reference is associated with detecting the first access point, and the second time reference is associated with detecting at least one or more second access points.

2. The method of claim 1, wherein associating the known location identifier further comprises:

receiving, by the mobile device, input indicative of an approximate location; and associating, by the mobile device, the approximate location with the known location identifier.

3. The method of claim 1, wherein associating the known location identifier with the new location identifier further comprises requesting an indicia associated with the known location identifier.

4. The method of claim 1, wherein associating the known location identifier further comprises determining the known location identifier based at least in part on identifying at least one of the BSSID or the SSID values associated with the one or more second access points.

5. The method of claim 1, wherein associating the known location identifier further comprises determining that a signal strength associated with the first access point satisfies a threshold value at a second time reference, wherein the second time reference is associated with detecting one or more second access points.

6. A non-transitory computer-readable medium having stored thereon instructions, that when executed by a machine, cause the machine to:
 identify, by an electronic device comprising at least one processor, one or more initial access points;
 detect, by the electronic device, at least one of an initial basic service set identifier (BSSID) value associated with each of the one or more initial access points;
 determine, by the electronic device, a known location identifier associated with the one or more initial access points based at least in part on the corresponding to at least one of the BSSID value;
 detect, by the electronic device, a new access point;
 identify, by the electronic device, a new BSSID value associated with the new access point, wherein the new BSSID is not the same as the initial BSSID; and
 associate, by the electronic device, the known location identifier with the new access point based at least in part on the new BSSID value;
 wherein associating the known location identifier with the new access point further comprises identifying that at least one of the initial BSSID values associated with the one or more initial access points is similar to the new BSSID value and determining that a first reference time associated with detecting the one or more initial access points is within a time threshold of a second reference time associated with detecting the new access point.

7. The non-transitory computer-readable medium of claim 6, wherein associating the known location identifier with the new access point further comprises determining that a spatial range associated with the one or more initial access points is within a spatial threshold of a spatial range associated with the new access point.

8. The non-transitory computer-readable medium of claim 6, wherein identifying the known location identifier associated with one or more initial access points further comprises receiving at least one signal beacon associated with the one or more initial access points, wherein the at least one signal beacon carries the BSSID value associated with the one or more initial access points.

9. The non-transitory computer-readable medium of claim 6, further comprising updating a location database based at least in part on associating the known location identifier with the new access point.

10. The non-transitory computer-readable medium of claim 6, further comprising restricting access to information, by the electronic device, based at least in part on the known location identifier.

11. The non-transitory computer-readable medium of claim 10, wherein restricting access to information by the electric device further comprises restricting at least one of:
 access to data on the electronic device based at least in part on a security profile; or
 access to one or more connections to one or more other devices by the electronic device based at least in part on a security profile.

12. An electronic device comprising:
 a wireless communications module comprising a transceiver configured to receive a first beacon corresponding to a first access point and a second beacon corresponding to a second access point; and
 at least one processor configured to identify, based at least in part on the first beacon and the second beacon, a basic service set identifier (BSSID) value associated with each of the first access point and the second access point, identify a known location identifier associated with the first access point, and determine that the known location identifier is associated with the second access point, wherein the BSSID value associated with the first access point is not the same as the BSSID value associated with the second access point,
 wherein determining that the known location identifier is associated with the second access point is based at least in part on at least one of the BSSID values associated with the first access point and the second access point or a first range associated with the first access point and a second range associated with the second access point,
 wherein associating the known location identifier with the second access point further comprises determining that the BSSID value of the first access point is similar to the BSSID value associated with the second access point and determining that a first reference time associated with detecting the first access point is within a time threshold of a second reference time associated with detecting the second access point.

13. The electronic device of claim 12, wherein the at least one processor is further configured to detect, by the electronic device, the first access point.

14. The electronic device of claim 12, wherein identifying the known location identifier associated with a first access point further comprises determining, by the at least one processor, that the electronic device is spatially within a range associated with the first access point for a predetermined span of time.

15. The electronic device of claim 12, wherein detecting the second access point further comprises detecting, by the at least one processor, the second access point while the electronic device is within a range associated with the first access point.

16. The electronic device of claim 12, wherein associating the known location identifier with the second access point further comprises associating responsive to determining that a range associated with the first access point overlaps, by the at least one processor, at least in part, with the range associated with the second access point.

17. The electronic device of claim 12, further comprising the at least one processor configured to update a location database based at least in part on the associating the known location identifier with the second access point.

18. A method comprising:
 detecting, by a mobile device comprising at least one processor, one or more initial access points at a first time reference;
 identifying, by the mobile device, an initial basic service set identifier (BSSID) value associated with each of the one or more initial access points;
 identifying a known location indicator, by the mobile device, that is associated with the initial BSSID value associated with each of the one or more initial access points;
 detecting, by the mobile device, a new access point at a second time reference, and identifying at least one of a new BSSID value and associated with the new access point, wherein the at least one of the new BSSID is not the same as the initial BSSID; and associating, by the mobile device, the new access point to the known location identifier based upon, at least in part, on at least one of the one or more initial BSSID values and the new BSSID value are similar and the first time reference and the second time reference are within a predetermined range of each other; wherein associating, by the mobile device, the new access point to the known location identifier if signal strength associated with at least one or more initial access points satisfies a threshold value at the second time reference.

19. The method of claim 18, wherein detecting the new access point includes detecting a signal associated with the new access point for at least a predetermined period of time.

* * * * *